UNITED STATES PATENT OFFICE.

HERMAN C. G. LUYTIES, OF ST. LOUIS, MISSOURI.

DENTIFRICE.

No. 834,676.  Specification of Letters Patent.  Patented Oct. 30, 1906.

Application filed February 23, 1906. Serial No. 302,471.

*To all whom it may concern:*

Be it known that I, HERMAN C. G. LUYTIES, a citizen of the United States, residing in the city of St. Louis, State of Missouri, have invented a new and useful Improvement in Dentifrices, of which the following is a specification.

My invention relates to a dentifrice powder having healing, soothing, and antiseptic properties and is of that class wherein active oxygen is yielded by certain component parts of the powder when used. It has been proposed to use calcium peroxid in connection with an abrading-powder for this purpose; but the oxygen of calcium peroxid is only liberated in an acid solution, and hence the mouth being sometimes neutral or slightly alkaline the calcium peroxid frequently fails to yield active oxygen.

I have discovered that strontium peroxid, either alone or in combination with boracic acid, together with an abrading-powder, possesses valuable properties, adapting it for use in connection with a dentifrice. Strontium peroxid yields active oxygen in neutral and slightly alkaline solutions, as well as in acid solutions, and hence is more effective than calcium peroxid, which, as stated, needs acidity in order to yield active oxygen.

Strontium peroxid may be used alone in combination with an abrading-powder, such as precipitated chalk, or it may be combined with other substances, as desired. As strontium possesses slightly caustic properties, it may be desirable to combine boracic acid therewith, the combination when in solution resulting in the formation of strontium borate, possessing the well-known healing, soothing, and antiseptic properties of boracic acid and the slightly astringent properties of strontium, the caustic properties of strontium being neutralized by its combination with the boracic acid.

It is obvious that a saponaceous substance may also be used in the combination and that instead of being in the form of a powder it may be compressed into tablet or lozenge form.

As a practical formula I have ascertained that a dentifrice comprising when strontium peroxid and precipitated chalk, for instance, are used from two to three per cent. of strontium peroxid is sufficient to yield active oxygen for the purpose described and that when boracic acid is used in the combination a similar percentage of strontium peroxid and its equivalent in boracic acid produces a satisfactory dentifrice. If a saponaceous substance, such as powdered castile soap, is added, I prefer to use from two to three per cent. thereof—for example, two per cent. of strontium peroxid, two per cent. of boracic acid, two per cent. of powdered castile soap, and ninety-four per cent. of precipitated chalk. It is obvious that coloring and flavoring matter may be added as desired and that the proportions stated may be altered and other ingredients added to or substituted for those mentioned.

What I claim, and desire to secure by Letters Patent, is—

1. A dentifrice composition containing strontium peroxid and an abrading-powder.

2. A dentifrice composition containing strontium peroxid, boracic acid and an abrading-powder substantially in the proportions and for the purpose specified.

In witness whereof I have hereunto signed my name in the presence of two subscribing witnesses.

HERMAN C. G. LUYTIES.

Witnesses:
ROBT. W. ASHLEY,
OLIN A. FOSTER.